United States Patent
Mok et al.

(10) Patent No.: US 8,341,709 B2
(45) Date of Patent: Dec. 25, 2012

(54) PUSHING CERTIFICATE CHAINS TO REMOTE DEVICES

(75) Inventors: Cheryl Mok, Waterloo (CA); Van Quy Tu, Kitchener (CA)

(73) Assignee: Research In Motion Limited, Waterloo (CA)

( * ) Notice: Subject to any disclaimer, the term of this patent is extended or adjusted under 35 U.S.C. 154(b) by 771 days.

(21) Appl. No.: 12/410,597

(22) Filed: Mar. 25, 2009

(65) Prior Publication Data

US 2010/0100731 A1 Apr. 22, 2010

Related U.S. Application Data

(60) Provisional application No. 61/107,519, filed on Oct. 22, 2008.

(51) Int. Cl.
 *H04L 9/00* (2006.01)
 *H04L 29/06* (2006.01)
 *G06F 21/00* (2006.01)

(52) U.S. Cl. ............. 726/6; 713/156; 713/157; 713/176

(58) Field of Classification Search ........................ None
 See application file for complete search history.

(56) References Cited

U.S. PATENT DOCUMENTS

| | | | |
|---|---|---|---|
| 2005/0015587 A1* | 1/2005 | Stransky ...................... | 713/156 |
| 2006/0036848 A1* | 2/2006 | Brown et al. ................. | 713/156 |
| 2006/0047949 A1* | 3/2006 | Brown et al. ................. | 713/156 |
| 2006/0143442 A1* | 6/2006 | Smith ........................... | 713/156 |
| 2006/0168447 A1* | 7/2006 | Pailles et al. ................. | 713/176 |
| 2008/0301790 A1* | 12/2008 | Halasz et al. ..................... | 726/6 |
| 2009/0215411 A1* | 8/2009 | Tucker et al. ................ | 455/90.2 |
| 2010/0125737 A1* | 5/2010 | Kang ............................ | 713/176 |
| 2010/0205429 A1* | 8/2010 | Alrabady et al. ............. | 713/156 |

FOREIGN PATENT DOCUMENTS

| | | | |
|---|---|---|---|
| EP | 1732263 A1 | 12/2006 | |
| WO | 2006131505 A1 | 12/2006 | |

\* cited by examiner

*Primary Examiner* — Philip Chea
*Assistant Examiner* — Dorianne Alvarado David
(74) *Attorney, Agent, or Firm* — Ridout & Maybee LLP

(57) ABSTRACT

Rather than managing a certificate chain related to a newly issued identity certificate at a terminal to which a wireless device occasionally connects, a certificate server can act to determine the identity certificates in a certificate chain related to the newly issued identity certificate. The certificate server can also act to obtain the identity certificates and transmit the identity certificates towards the device that requested the newly issued identity certificate. A mail server may receive the newly issued identity certificate and the identity certificates in the certificate chain and manage the timing of the transmittal of the identity certificates. By transmitting the identity certificates in the certificate chain before transmitting the newly issued identity certificate, the mail server allows the user device to verify the authenticity of the newly issued identity certificate.

11 Claims, 7 Drawing Sheets

PUSHING CERTIFICATE CHAINS TO REMOTE DEVICES

CROSS REFERENCE TO RELATED APPLICATIONS

The present application claims priority to U.S. Provisional Patent Application Ser. No. 61/107,519, filed 22 Oct. 2008, the contents of which are hereby incorporated herein by reference.

FIELD OF THE INVENTION

The present application relates remote device security and, more specifically, to pushing chains of identity certificates to remote devices.

BACKGROUND OF THE INVENTION

User devices, including, but not restricted to, wireless mobile communication devices, personal computers, laptop or portable computers, smartphones, personal digital assistants (PDAs), and the like, may generate cryptographic keys for use in a public key infrastructure (PKI) scheme. In a PKI scheme, a device generates a public key and a corresponding private key. However, such keys are of little use unless the public key is reliably associated with the identity of the user device, or of the user of the user device.

A public key certificate (or identity certificate) is an electronic document, issued by a trusted party. The public key certificate incorporates a digital signature to bind together a public key with an identity—information such as the name of a person or an organization, an associated address and so forth. The certificate can be used to verify that a public key belongs to an individual.

An identity certificate typically contains: a public key; an owner's name; an expiration date of the public key; the name of the issuer; an identity of the Certificate Authority that issued the digital certificate; a serial number for the digital certificate; and a digital signature of the issuer.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
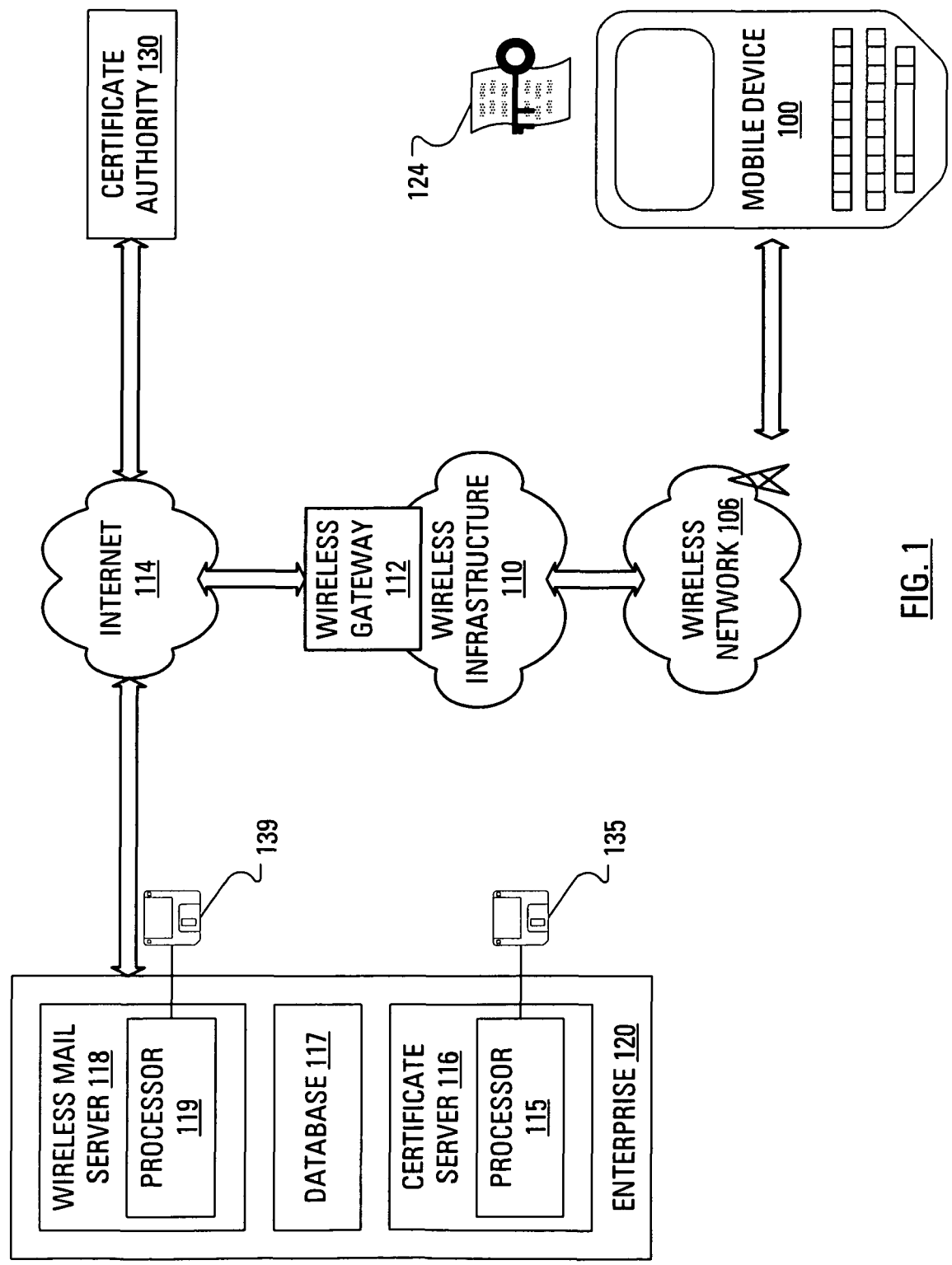
FIG. 1 illustrates an example system, including a user device, a certification authority and a certificate server, in which aspects of the present application find use.

In public key infrastructure systems, a certificate signing request (also "CSR" or certification request) is a message sent from an applicant to a Certificate Authority (CA) to apply for an identity certificate for a public key. The public key has been previously generated in conjunction with the generation of an associated private key. The certification request contains information identifying the applicant and the public key generated by the applicant. The corresponding private key is not included in the certification request, but is used to digitally sign the entire certification request.

If the certification request is successful, the CA will transmit, back to the applicant, an identity certificate that has been digitally signed with the private key of the CA, for example, as an attachment to an e-mail message.

The identity certificate may be most useful to the applicant device if the authenticity of the identity certificate to be verified. Although the applicant device may verify the authenticity of the identity certificate, in part, through use of the public key of the CA and the signature that has been transmitted with the identity certificate, it would be useful if the authenticity of the public key of the CA could also be verified. The public key of the CA may be verified with an associated identity certificate. Of course, the identity certificate associated with the public key of the CA is issued by a higher-ranked CA, which may also have a public key verifiable with an identity certificate issued by an even higher-ranked CA, and so on. This trail of verification may be represented as a set of one or more identity certificates, where the set is known as a certificate chain. A verification process may require availability, on the applicant device, of each of the identity certificates in the certificate chain leading up to the identity certificate newly issued by the CA.

Often, the chain of certificates is placed on the applicant device through a connection between the applicant device and a user's computer that is otherwise used to configure various aspects of the operation of the applicant device.

Unfortunately, an identity certificate that has been delivered to the applicant device while the applicant device is disconnected from the user's computer is unusable until the user has reconnected the applicant device to the user's computer to import a certificate chain for the identity certificate. Such a necessity for a secondary device to obtain and place on the applicant device a certificate chain for a particular newly issued identity certificate may be particularly problematic when the particular newly issued identity certificate is critical in nature. For example, the particular newly issued identity certificate may be required for use in an exchange of secure e-mail messages or may be required for use in accessing a secure wireless access point.

It follows that it may be considered to move the management of certificate chains from the secondary device to a certificate chain management application on the applicant device. However, if the management of certificate chains is to be moved to the certificate chain management application, the certificate chain management application may be required to determine the set of certificates that make up a certificate chain for a particular newly issued identity certificate. Additionally, the certificate chain management application may be required to determine where to obtain the various identity certificates in the certificate chain. Furthermore, the certificate chain management application may be required to manage duplicate certificates that can occur as a result of intersecting certificate chains.

Moving the management of certificate chains from the secondary device to a certificate chain management application located somewhere other than on the applicant device may be beneficial. To this end, a certificate server may be introduced to the set of devices that support the applicant device. Upon receipt of a particular newly issued identity certificate destined for an applicant device, the certificate server can determine the identity certificates that make up the certificate chain, can determine which of the required identity certificates are already on the device and can determine where to obtain those identity certificates that are not already stored on the applicant device. The certificate server can then arrange the provision of required identity certificates to the applicant device.

According to an aspect of the present application, there is provided a method of handling a newly issued identity certificate. The method includes receiving the newly issued identity certificate for use by a user device, determining a certificate chain related to the newly issued identity certificate, obtaining each identity certificate in the certificate chain, transmitting each identity certificate and transmitting the newly issued identity certificate. In other aspects of the present application, a certificate server is provided for carrying out this method and a computer readable medium is provided for adapting a processor to carry out this method.

According to another aspect of the present application, there is provided a method of handling a newly issued identity certificate. The method includes obtaining the newly issued identity certificate, wherein the newly issued identity certificate is associated with a certificate chain defined as a set of identity certificates, determining a subset of the set, the subset including all of the identity certificates, in the set, that have not previously been transmitted to a user device, transmitting, to the user device, each identity certificate in the subset and transmitting, to the device, the newly issued identity certificate. In other aspects of the present application, a mail server is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the overview of FIG. 1.

FIG. 1 shows a user device in the form of a mobile communication device 100. It will be appreciated by those skilled in the art that the mobile communication device 100 may comprise any computing or communication device that is capable of connecting to a network by wireless means, including, but not limited to, personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The user device 100 may, for example, be connected to an Internet Service Provider on which a user of the system of FIG. 1, likely the user associated with the user device 100 illustrated in FIG. 1, has an account.

The user device 100 may be capable of sending and receiving messages and other data via wireless transmission and reception, as is typically done using electromagnetic waves in the radio frequency (RF) spectrum. The exchange of messages and other data may occur, for instance, between the user device 100 and a base station in a wireless network 106. The user device 100 may receive data by other means, for example through a direct connection to a port provided on the user device 100. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the user device 100 and the Internet 114 allows the user device 100 to access a certificate server 116 that is connected to the Internet 114. Operation of the certificate server 116 may be controlled by a certificate server processor 115 executing identity certificate handling software for executing methods exemplary of the present disclosure from a software medium 135, which could be a disk, a tape, a chip or a random access memory containing a file downloaded from a remote source. Also connected to the Internet 114 may be a wireless mail server 118. Operation of the wireless mail server 118 may be controlled by a mail server processor 119 executing identity certificate handling software for executing methods exemplary of the present disclosure from a software medium 139, which could be a disk, a tape, a chip or a random access memory containing a file downloaded from a remote source. The certificate server 116 and the wireless mail server 118 may be grouped together in an enterprise 120 and share access to a database 117. Also connected to the Internet 114 may be a certificate authority 130. The user device 100 may store a key pair 124 that includes a private cryptographic key and a corresponding public cryptographic key.

Figure 2:
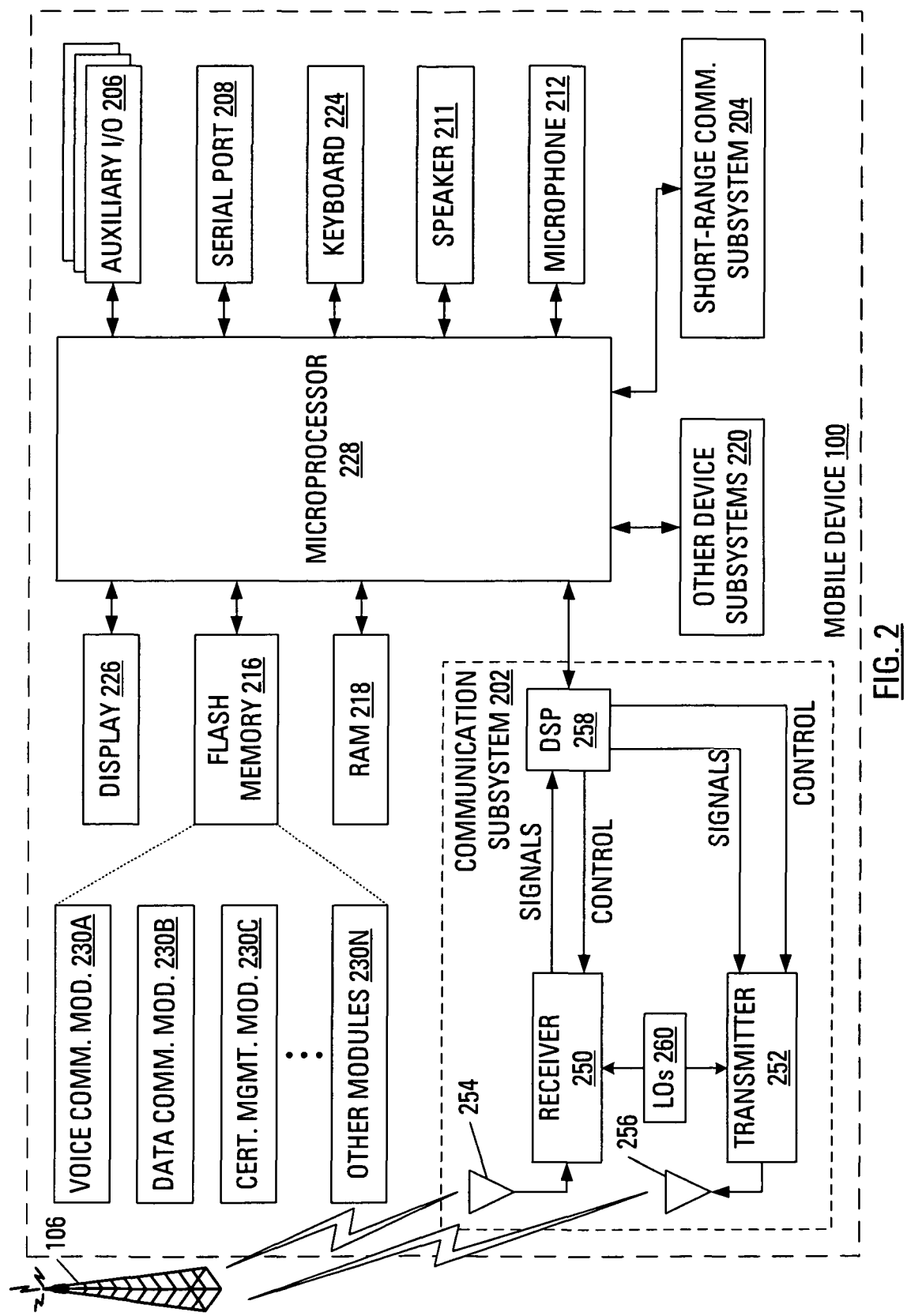
FIG. 2 illustrates a block diagram of the user device of FIG. 1 according to an embodiment.

FIG. 2 illustrates the user device 100. The user device 100 includes a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the user device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the user device 100 are shown schematically in FIG. 2. These may include a communications subsystem 202, a short-range communications subsystem 204, the keyboard 224 and the display 226. The user device 100 may further include other input/output devices, such as a set of auxiliary I/O devices 206, a serial port 208, a speaker 211 and a microphone 212. The user device 100 may further include memory devices including a flash memory 216 and a Random Access Memory (RAM) 218 and various other device subsystems 220. The user device 100 may comprise a two-way radio frequency (RF) communication device having voice and data communication capabilities. In addition, the user device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the user device 100. A predetermined set of software applications that control basic device operations, such as a voice communications module 230A and a data communications module 230B, may be installed on the user device 100 during manufacture. A certificate management module 230C may also be installed on the user device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the user device 100 is intended to operate. For example, the communication subsystem 202 of the user device 100 may be designed to operate with the MOBITEXT™, DATATAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the user device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the user device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the user device 100. In addition, the display 226 may also be utilized in voice communication mode, for example, to display the identity of a calling party, the duration of a voice call, or other voice call related information.

The short-range communications subsystem 204 enables communication between the user device 100 and other proximate systems or devices, which need not necessarily be similar devices. For example, the short-range communications subsystem may include an infrared device and associated circuits and components, or a BLUETOOTH™ communication module to provide for communication with similarly-enabled systems and devices.

In overview, the certificate server 116 receives a newly issued identity certificate on behalf of the user device 100. The certificate server 116 determines the identity certificates in the certificate chain related to the newly issued identity certificate, obtains the identity certificates in the certificate chain and pushes the identity certificates in the certificate chain, along with the newly issued identity certificate, to the user device 100 via the mail server 118.

To prepare the user device 100 for certificate management, the wireless mail server 118 transmits an information technology (IT) policy to the user device 100. In part, the IT policy includes a CA profile. The CA profile includes a description of a set of information needed by the user device 100 to generate the key pair 124 and compile the information necessary to formulate a certification request for the CA 130. Examples of such information include key lengths, algorithm information, necessary distinguished name information, etc.

An example CA profile has the following structure:
Certificate Authority Profile Name: Test Profile
Certificate Authority Type: MS-Enterprise
Certificate Authority Host: ca.test.domain
Certificate Port: 12345
Key Algorithm: RSA
Key Length: 2048

Figure 3:
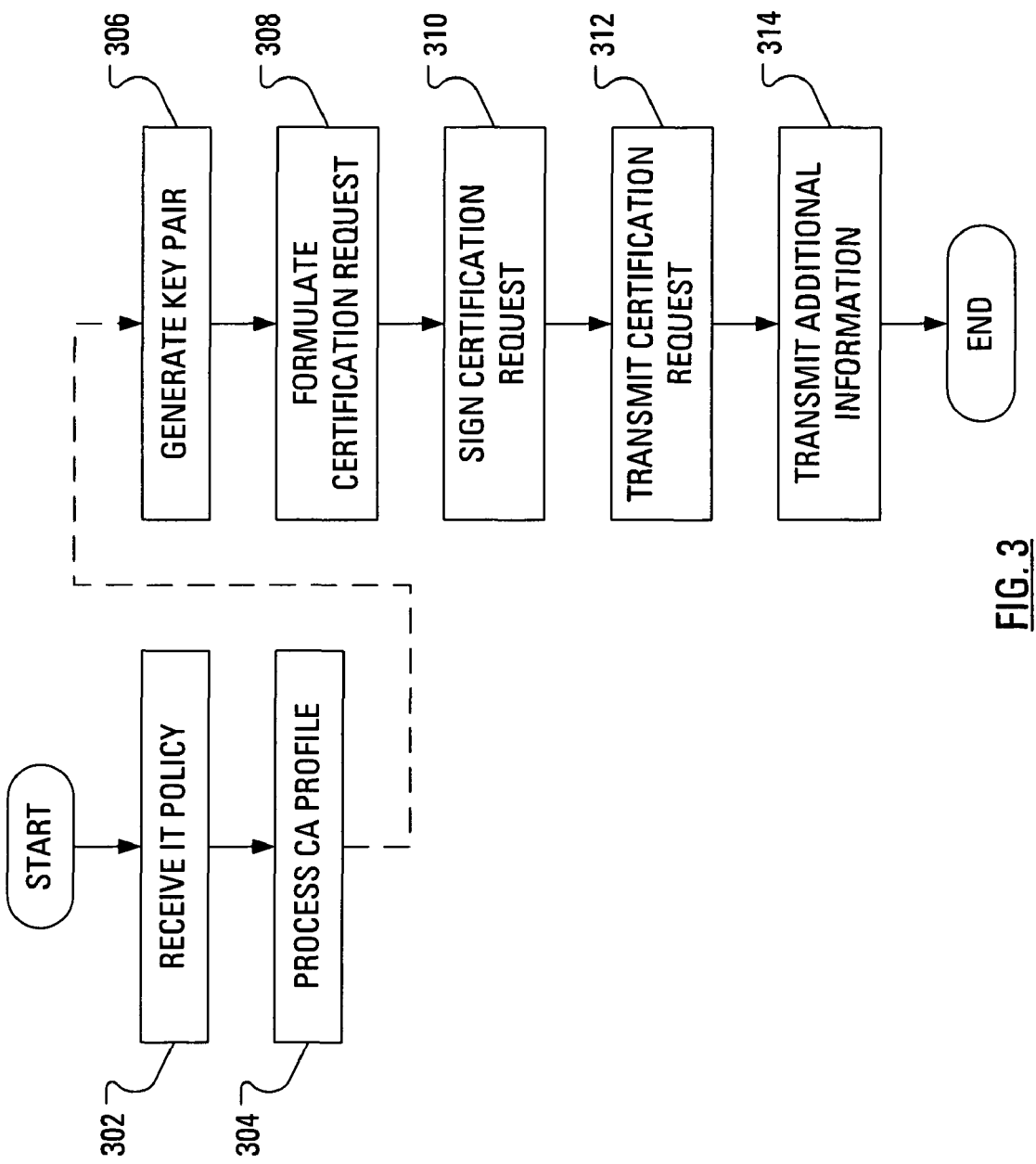
FIG. 3 illustrates example steps in a method of managing, at the user device of FIG. 2, a certification request according to an embodiment.

Example steps in a method of managing, at the user device 100, a certification request are illustrated in FIG. 3. As discussed above, the user device 100 receives (step 302) an IT policy that includes a CA profile that allows the user device 100 to formulate a certification request. Upon receiving the CA profile, the device processes (step 304) the CA profile.

Some time later, the user device 100 may require a cryptographic key pair. Accordingly, the user device 100 generates (step 306) the public-private key pair 124 and collects any other information that, according to the CA profile, needs to be sent as part of the certification request. The user device 100 then formulates (step 308) the certification request. As part of formulating (step 308) the certification request, the user device 100 inserts an e-mail address into a field of the certification request, where the contents of the field indicate, to the CA 130, a destination for the issued identity certificate. The inserted e-mail address is associated with the user of the user device 100. While the contents of the field can be used to indicate a destination for the issued identity certificate for this application, it should be noted that, the field is not necessarily used in this manner, or at all, by the CA 130.

The certification request may be, for example, a PKCS-10 certification request. "PKCS" refers to a group of Public Key Cryptography Standards devised and published by RSA Security. PKCS-10, in particular, is a Certification Request Standard that defines a format for messages sent to a certification authority to request certification of a public key. The PKCS-10 standard is specified in Request For Comments (RFC) 2986 published by the Internet Engineering Task Force (IETF) at www.ietf.org.

After formulating the certification request, the user device 100 signs (step 310) the certification request. Such signing of the certification request may involve generating a hash of the certification request and encrypting the hash of the certification request using the private key half of the key pair 124. The encrypted hash of the certification request may then be transmitted along with the certification request as a signature. Once the certification request has been signed, the user device 100 transmits (step 312) the certification request and the signature to the certificate server 116 via the wireless mail server 118. As part of forwarding the certification request to the certificate server 116, the wireless mail server 118 may store an indication that the state of the certification request is "sent".

In addition to transmitting (step 312) the signed certification request, the user device 100 may also transmit (step 314) additional information about the public key for which the certification request has been generated. In particular, the user device 100 may transmit (step 314), to the certificate server 116, other properties of the CA profile for which the certification request was originally formulated. The additional information allows the certificate server 116 to retrieve information necessary to verify that the formulated certification request contains all the necessary information.

Figure 4:
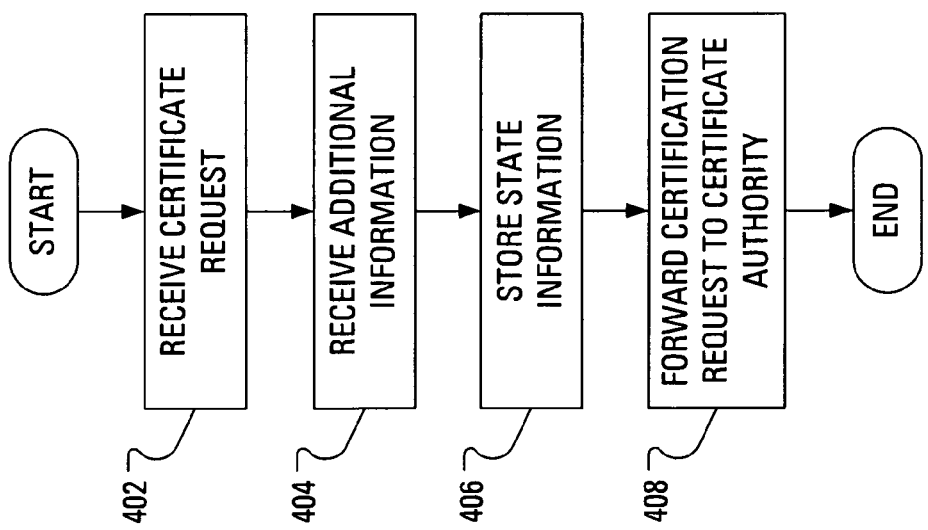
FIG. 4 illustrates example steps in a method of handling, at the certificate server of FIG. 1, a certification request from the user device according to an embodiment.

Example steps in a method of handling, at the certificate server 116, the certification request from the user device 100 are illustrated in FIG. 4. Initially, the certificate server 116 may receive (step 402) the certification request from the user device 100. Additionally, the certificate server 116 may receive (step 404) the additional information from the user device 100. Responsive to receiving (steps 402, 404) the certification request and the additional information from the user device 100, the certificate server 116 may store (step 406) some state data about the certification request locally. For instance, the certificate server 116 may record the additional information received in conjunction with the certification request. Additionally, the certificate server 116 forwards (step 408) the certification request and associated signature to the CA 130.

Figure 5:
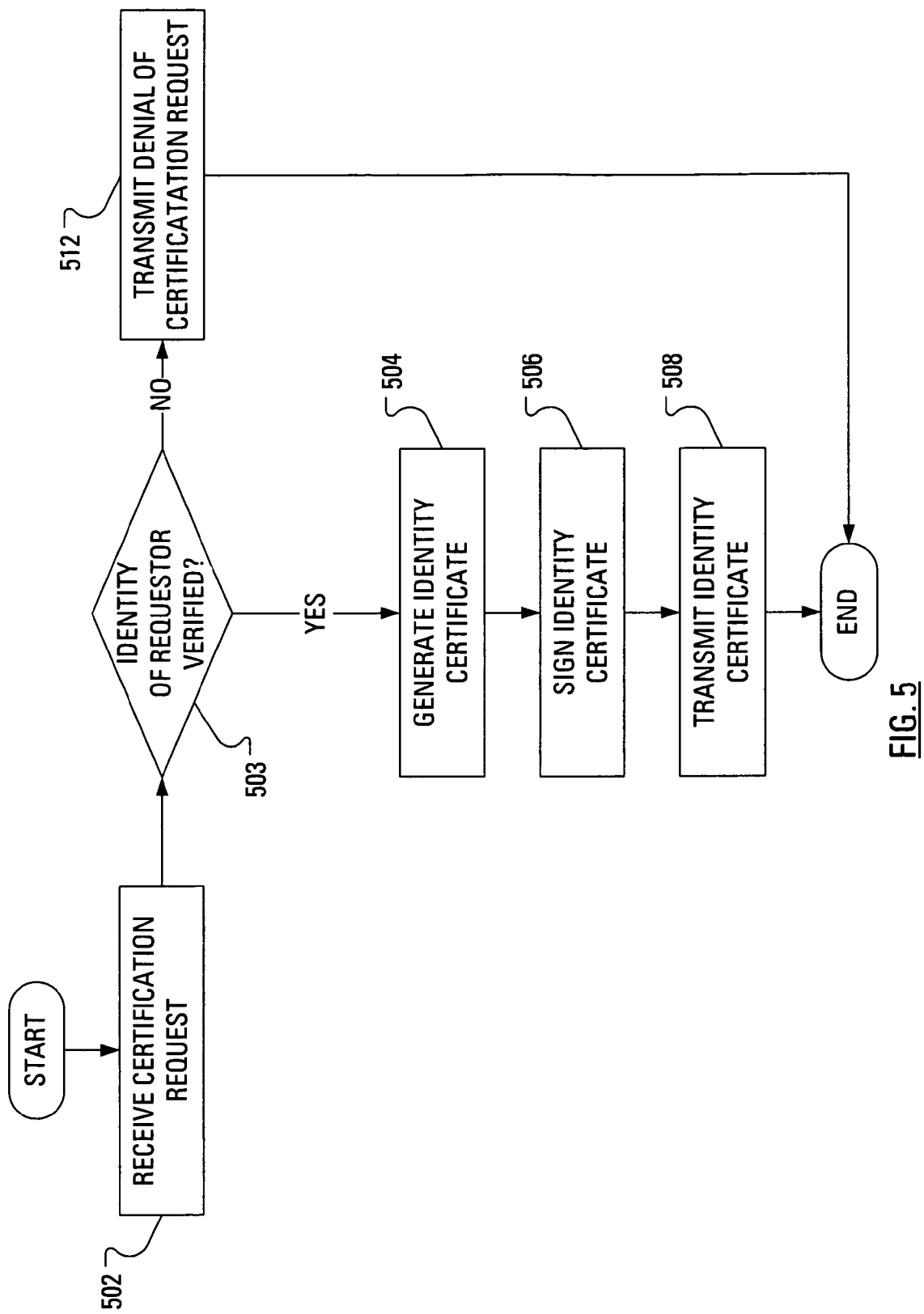
FIG. 5 illustrates example steps in a method of handling, at the certificate authority of FIG. 1, a certification request from the certificate server of FIG. 1 according to an embodiment.

Example steps in a method of handling, at the CA 130, the certification request from the certificate server 116 are illustrated in FIG. 5.

Upon receiving (step 502) the certification request from the certificate server 116, the CA 130 may carry out an identity verification process (step 503) to ensure that the certification request came from the user device 100, as indicated in the certification request. As mentioned, the user device 100 signs (step 310, FIG. 3) the certification request with its private key. Accordingly, the identity verification process carried out by the CA 130 may involve authenticating the signature transmitted with the certification request through use of the public key associated with the user device 100.

Upon failure to verify the identity of the user device 100, the CA 130 may transmit (step 512) a denial of the certification request to the user device 100.

Upon successfully verifying the identity of the user device 100, the CA 130 generates (step 504) an identity certificate. The CA 130 may, for instance, generate the identity certificate according to a standard published by the Telecommunication Standardization Sector of the International Telecommunication Union. The sector is known as ITU-T and the standard is known as X.509. Along with the format for identity certificates, the X.509 standard covers standard formats for certificate revocation lists, attribute certificates, and a certification path validation algorithm. Once the identity certificate has been generated, the CA 130 generates a signature (step 506) for the identity certificate. Such signature generation may involve use of the private key associated with the CA 130. The CA 130 may then transmit (step 508) the identity certificate, and related signature, as attachments to an e-mail message addressed to the user of the user device 100.

Based on being addressed to the user of the user device 100, the e-mail message with the attached identity certificate is routed through the Internet 114 to the wireless mail server 118. Responsive to receiving the e-mail message with the attached identity certificate, the wireless mail server 118 passes the e-mail message with the attached identity certificate to the certificate server 116 for processing.

Figure 6:
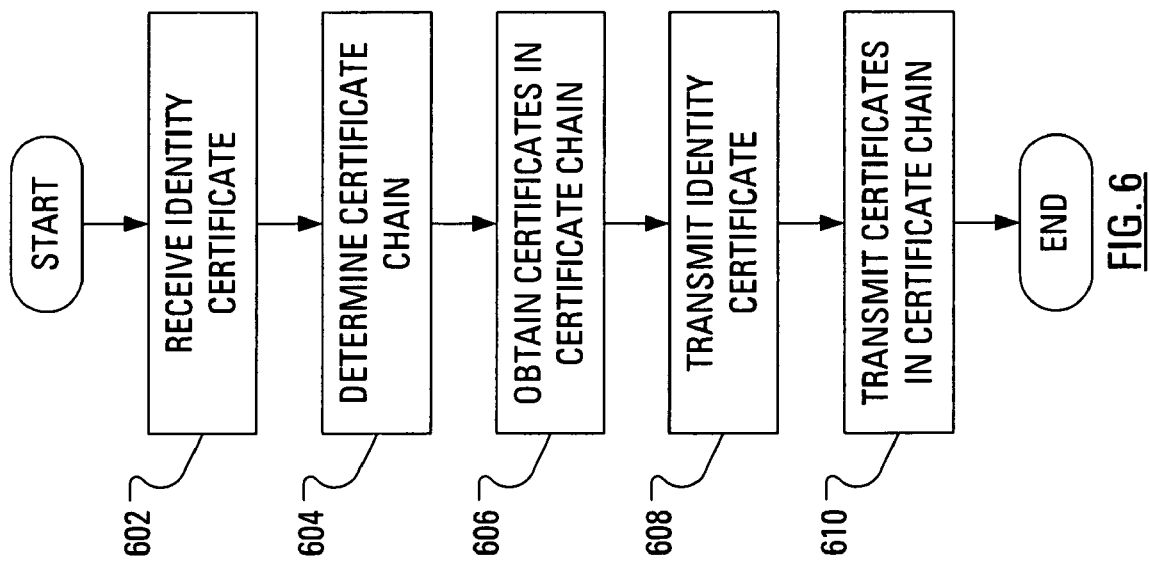
FIG. 6 illustrates example steps in a method of handling, at the certificate server of FIG. 1, a newly issued identity certificate from the certificate authority of FIG. 1 according to an embodiment.

Example steps in a method of handling, at the certificate server 116, receipt of the identity certificate from the CA 130 are illustrated in FIG. 6.

Upon receiving (step 602) the identity certificate from the wireless mail server 118, the certificate server 116 may determine (step 604) the certificate chain for the identity certificate. The certificate chain has been described above as a set of identity certificates. Determining (step 604) the certificate chain may involve determining the identity of each member identity certificate in the set and, optionally, from which source the member identity certificate may be obtained. Upon determining (step 604) the certificate chain for the identity certificate, the certificate server 116 may obtain (step 606) each of the identity certificates in the certificate chain. The certificate server 116 may then transmit (step 608) the newly issued identity certificate to the database 117. The certificate server 116 may also transmit (step 610) each of the identity certificates in the certificate chain to the database 117.

Notably, while the certificate server 116 is obtaining (step 606) each of the identity certificates in the certificate chain, the certificate server 116 may store the identity certificates locally. Accordingly, when a newly issued identity certificate has a certificate chain that is determined by the certificate server 116 to include a previously obtained identity certificate, the certificate server 116 may merely obtain the required identity certificate from local storage rather than from the original source, thereby conserving time and network resources.

Figure 7:
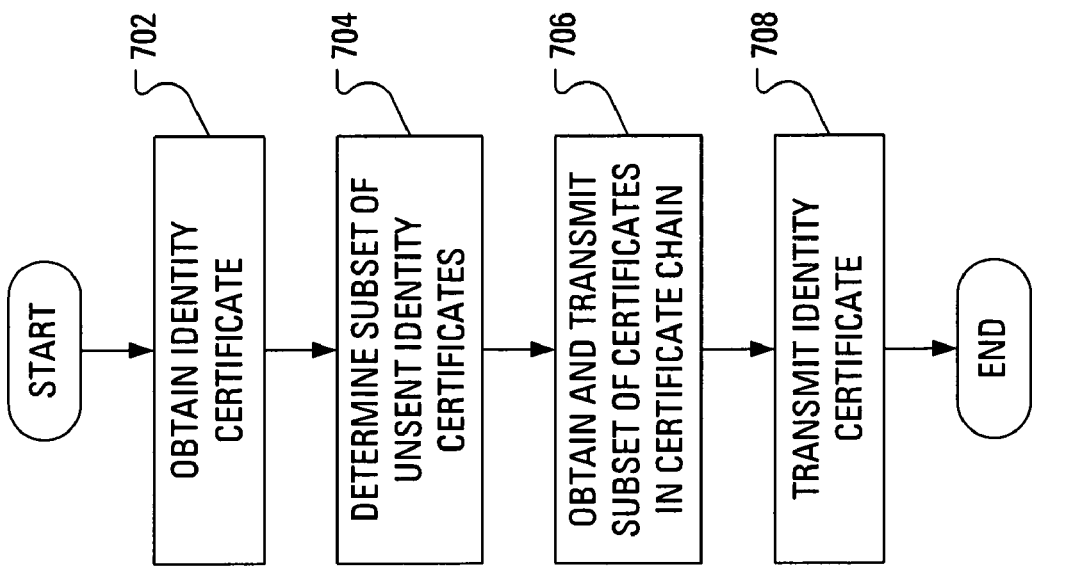
FIG. 7 illustrates example steps in a method of handling, at the mail server of FIG. 1, the newly issued identity certificate and related identity certificates from the certificate server of FIG. 1 according to an embodiment.

Example steps in a method of handling, at the wireless mail server 118, entry, into the database 117, of the newly issued identity certificate and the identity certificates in the certificate chain by the certificate server 116 are illustrated in FIG. 7.

The wireless mail server 118 may be configured to monitor the database 117 to recognize relevant activity. The wireless mail server 118 may also be configured to utilize a configuration channel to pass non-message data to each of the associated wireless communication devices.

While monitoring the database 117, the wireless mail server 118 may recognize that the newly issued identity certificate and the identity certificates in the associated certificate chain have been added to the database 117. Responsively, the wireless mail server 118 obtains (step 702), from the database 117, the newly issued identity certificate and determines (step 704) which of the identity certificates in the certificate chain have not already been transmitted to the user device 100. The wireless mail server 118 then obtains, from the database 117, and transmits (step 706), to the user device 100, those identity certificates not already received by the user device 100. The wireless mail server 118 then transmits (step 708), to the user device 100, the newly issued identity certificate.

Conveniently, the determining (step 704) which of the received identity certificates have not already been transmitted to the user device 100 and subsequently only transmitting (step 706) those that have not already been transmitted to the user device 100 may be seen as conserving wireless network resources between the wireless network server 118 and the user device 100.

The user device 100, upon receiving the identity certificates in the certificate chain, injects the identity certificates into a key store maintained in memory on the user device 100. Furthermore, the user device 100, upon receiving the newly issued identity certificate may store the newly issued identity certificate in the key store. As noted in conjunction with the description of FIG. 5, above, the CA 130 may sign the identity certificate. To confirm that the received newly issued identity certificate was generated by the CA 130, the user device 100 may process the signature included with the newly issued identity certificate. Such processing may involve the use of the public key of the CA 130. The authenticity of the public key of the CA 130 may be verified using the corresponding identity certificate in the key store. In some cases, the user device 100 may be delivered to the user pre-loaded with a set of well-known identity certificates.

The injection of identity certificates into the key store can be accomplished automatically by the user device 100. Alternatively, injection of certificates into the key store can be accomplished under direct user management. An administrator can configure individual user devices 100 to establish a default certificate injection procedure.

It should be readily recognized that transferring, to the certificate server 116, management of the obtaining of the identity certificates in the certificate chain beneficially obviates requirements for the user device 100 to connect to the user's computer to obtain identity certificates in the certificate chain.

Beneficially, through use of aspects of the present application, the authenticity of a newly issued identity certificate may be easily verified, thus allowing the newly issued identity certificate to be used as soon as newly issued identity certificate is injected in to the key store. More importantly, this solution attempts to ensure that the user device 100 has the opportunity to inject the certificate chain in to its key store before the identity certificate is received.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of handling a newly issued identity certificate, said method comprising:
 receiving, at a certificate server, said newly issued identity certificate for use by a user device, said newly issued identity certificate generated by a certificate authority;
 responsive to said receiving, determining, at said certificate server, a certificate chain related to said newly issued identity certificate, said certificate chain including an identity certificate associated with said certificate authority;
 responsive to said determining, obtaining, at said certificate server, each identity certificate in said certificate chain;

responsive to said obtaining, transmitting, from said certificate server, each said identity certificate to a database, where said database is external to said user device; and transmitting, at said certificate server, said newly issued identity certificate to said database.

2. The method of claim 1, wherein said database is monitored by an email server associated with said user device.

3. The method of claim 1 wherein said database is associated with a server of said user device.

4. The method of claim 1 further comprising, responsive to said obtaining, storing, in local storage, each said identity certificate.

5. The method of claim 4 wherein said obtaining comprises retrieving at least one of said identity certificates from said local storage.

6. A certificate server comprising:
a processor and a memory device configured to:
receive a newly issued identity certificate for use by a user device, said newly issued identity certificate generated by a certificate authority;
responsive to said receiving, determine a certificate chain related to said newly issued identity certificate, said certificate chain including an identity certificate associated with said certificate authority;
responsive to said determining, obtain each identity certificate in said certificate chain;
responsive to said obtaining, transmit each said identity certificate to a database; and transmit said newly issued identity certificate to said database, wherein said database is external to said user device.

7. A non-transitory computer readable medium containing computer-executable instructions that, when performed by a processor, cause said processor to:
receive a newly issued identity certificate for use by a user device, said newly issued identity certificate generated by a certificate authority;
responsive to said receiving, determine a certificate chain related to said newly issued identity certificate, said certificate chain including an identity certificate associated with said certificate authority;
responsive to said determining, obtain each identity certificate in said certificate chain;
responsive to said obtaining, transmit each said identity certificate to a database;
and transmit said newly issued identity certificate to said database, wherein said database is external to said user device.

8. A method of handling a newly issued identity certificate on behalf of a particular user device, said method comprising:
obtaining, at an email server, said newly issued identity certificate, wherein said newly issued identity certificate is associated with a certificate chain defined as a set of identity certificates;
responsive to said obtaining, determining, at said email server, a first subset of said set, said first subset including all of said identity certificates, in said set, that have previously been transmitted to said particular user device;
responsive to said obtaining, determining, at said email server, a second subset of said set, said subset including all of said identity certificates, in said set, that have not previously been transmitted to said particular user device;
responsive to said determining said second subset, transmitting, from said email server to said particular user device, each identity certificate in said second subset; and
transmitting, to said particular user device, said newly issued identity certificate.

9. The method of claim 8 further comprising transmitting messages to said particular user device over a first channel, wherein said transmitting said certificates comprises transmitting over a second channel.

10. An email server comprising:
a processor and a memory device configured to:
obtain a newly issued identity certificate, wherein said newly issued identity certificate is associated with a certificate chain defined as a set of identity certificates;
responsive to said obtaining, determine a first subset of said set, said first subset including all of said identity certificates, in said set, that have previously been transmitted to said particular user device;
responsive to said obtaining, determine a second subset of said set, said subset including all of said identity certificates, in said set, that have not previously been transmitted to said particular user device;
responsive to said determining said second subset, transmit, to said particular user device, each identity certificate in said second subset; and transmit, to said particular user device, said newly issued identity certificate.

11. A non-transitory computer readable medium containing computer-executable instructions that, when performed by a processor, cause said processor to:
obtain a newly issued identity certificate, wherein said newly issued identity certificate is associated with a certificate chain defined as a set of identity certificates;
responsive to said obtaining, determine a first subset of said set, said first subset including all of said identity certificates, in said set, that have previously been transmitted to said particular user device;
responsive to said obtaining, determine a second subset of said set, said subset including all of said identity certificates, in said set, that have not previously been transmitted to said particular user device;
responsive to said determining said second subset, transmit, to said particular user device, each identity certificate in said second subset; and transmit, to said particular user device, said newly issued identity certificate.

* * * * *